United States Patent
Lee et al.

(10) Patent No.: US 11,901,131 B2
(45) Date of Patent: Feb. 13, 2024

(54) MULTILAYER CERAMIC ELECTRONIC COMPONENT INCLUDING EXTERNAL ELECTRODES HAVING IMPROVED RELIABILITY

(71) Applicant: SAMSUNG ELECTRO-MECHANICS CO., LTD., Suwon-si (KR)

(72) Inventors: Kyo Yeol Lee, Suwon-si (KR); Seung Hun Han, Suwon-si (KR); In Young Kang, Suwon-si (KR); Jung Min Kim, Suwon-si (KR); Jeong Ryeol Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 2 days.

(21) Appl. No.: 17/466,508

(22) Filed: Sep. 3, 2021

(65) Prior Publication Data
US 2022/0208464 A1    Jun. 30, 2022

(30) Foreign Application Priority Data

Dec. 31, 2020  (KR) .......................... 10-2020-0189535

(51) Int. Cl.
*H01G 4/30* (2006.01)
*H01G 4/008* (2006.01)
(Continued)

(52) U.S. Cl.
CPC ............. *H01G 4/30* (2013.01); *H01G 4/008* (2013.01); *H01G 4/012* (2013.01); *H01G 4/224* (2013.01)

(58) Field of Classification Search
CPC .......... H01G 4/30; H01G 4/008; H01G 4/012; H01G 4/1209; H01G 4/2325; H01G 4/005

See application file for complete search history.

(56) References Cited

U.S. PATENT DOCUMENTS

| | | | |
|---|---|---|---|
| 4,377,619 A | 3/1983 | Schonhorn et al. | |
| 5,339,068 A * | 8/1994 | Tsunoda | H01C 1/142 338/308 |

(Continued)

FOREIGN PATENT DOCUMENTS

| | | |
|---|---|---|
| JP | 2000-164406 A | 6/2000 |
| JP | 3444291 B2 | 9/2003 |

(Continued)

*Primary Examiner* — David M Sinclair
*Assistant Examiner* — Daniel M Dubuisson
(74) *Attorney, Agent, or Firm* — MORGAN, LEWIS & BOCKIUS LLP

(57) ABSTRACT

A multilayer ceramic electronic component includes a ceramic body including a first internal electrode and a second internal electrode disposed to be alternately stacked with a dielectric layer interposed therebetween; a first external electrode connected to the first internal electrode and including a first electrode layer, a first conductive layer, and a first metal layer; a second external electrode connected to the second internal electrode and including a second electrode layer, a second conductive layer, and a second metal layer; and a first coating layer disposed on the ceramic body, the first electrode layer and the second electrode layer. The first conductive layer and the second conductive layer are sintered electrodes including a conductive metal and glass, and the first coating layer includes a plurality of openings disposed on the first electrode layer and the second electrode layer.

22 Claims, 3 Drawing Sheets

(51) Int. Cl.
  *H01G 4/012* (2006.01)
  *H01G 4/224* (2006.01)

(56) References Cited

U.S. PATENT DOCUMENTS

| | | | |
|---|---|---|---|
| 8,587,923 B2 | 11/2013 | Ogawa et al. | |
| 9,758,695 B2 | 9/2017 | Hong et al. | |
| 10,366,834 B1* | 7/2019 | Lee | H01G 4/248 |
| 10,395,840 B1* | 8/2019 | Park | H01G 2/065 |
| 2004/0240146 A1* | 12/2004 | Kayatani | H01G 2/103 |
| | | | 361/306.3 |
| 2012/0148917 A1* | 6/2012 | Kobayashi | H01M 4/0404 |
| | | | 977/932 |
| 2015/0287532 A1* | 10/2015 | Abe | H05K 3/3436 |
| | | | 427/79 |
| 2016/0027561 A1* | 1/2016 | Inoue | H01G 4/30 |
| | | | 338/20 |
| 2017/0154731 A1* | 6/2017 | Tahara | H01G 4/232 |
| 2017/0256359 A1* | 9/2017 | Masunari | H01G 4/005 |
| 2018/0033557 A1* | 2/2018 | Chien | H01G 4/236 |
| 2018/0130603 A1* | 5/2018 | Chong | H01B 1/02 |
| 2018/0144864 A1* | 5/2018 | Park | H01G 4/224 |
| 2019/0103224 A1* | 4/2019 | Han | H01G 4/2325 |
| 2019/0385795 A1 | 12/2019 | Yang et al. | |

FOREIGN PATENT DOCUMENTS

| | | |
|---|---|---|
| KR | 10-2019-0116161 A | 10/2019 |
| KR | 10-2019-0142179 A | 12/2019 |
| WO | 2014/027854 A1 | 2/2014 |

\* cited by examiner

MULTILAYER CERAMIC ELECTRONIC COMPONENT INCLUDING EXTERNAL ELECTRODES HAVING IMPROVED RELIABILITY

CROSS-REFERENCE TO RELATED APPLICATION

This application claims the benefit of priority to Korean Patent Application No. 10-2020-0189535, filed on Dec. 31, 2020 in the Korean Intellectual Property Office, the disclosure of which is incorporated herein by reference in its entirety.

TECHNICAL FIELD

The present disclosure relates to a multilayer ceramic electronic component.

BACKGROUND

In recent years, as an application area of electronic products has expanded, a technical field in which multilayer ceramic electronic components are used has also expanded. In particular, a structure in which an electronic control unit (ECU) or a transmission control unit (TCU) of a vehicle is disposed in an engine bay or directly attached to a transmission is used as vehicles are increasingly electronic.

However, when existing multilayer ceramic electronic components are applied to a harsh environment such as high temperature and high vibrations, expansion and contraction due to high/low temperature cycles are repeated to cause continuous mechanical stress. In addition, application of the continuous mechanical stress is a major cause of cracking in terminal electrodes or solders.

In addition, in the process of manufacturing a multilayer ceramic electronic component, a plating layer is often formed on an external electrode after sintering a ceramic body and the external electrode, and when an electronic component is manufactured in a high temperature heat treatment, there is a high possibility that a hydrophilic oxide layer having high surface energy is formed on a surface of the ceramic body and pores serving as a path through which moisture may penetrate occur at an interface between the ceramic body and the external electrode.

In particular, when the multilayer ceramic electronic component is continuously exposed to a high temperature and/or high humidity environment, the possibility of ion migration is increased in the external electrode of the multilayer ceramic electronic component itself. The oxide layer formed on the surface of the ceramic body has high surface energy causes moisture to easily adhere to the surface of the ceramic body due to its hydrophilicity upon application of high temperature, high humidity, and voltage. Through such moisture, an ion migration phenomenon in which an electrode material migrates toward the opposite electrode occurs, and a short circuit may occur, to degrade reliability of the multilayer ceramic electronic component.

SUMMARY

An aspect of the present disclosure may provide a multilayer ceramic electronic component in which a degradation of characteristics due to moisture penetration is prevented.

Another aspect of the present disclosure may provide a multilayer ceramic electronic component in which ion migration is suppressed.

Another aspect of the present disclosure may provide a multilayer ceramic electronic component in which a short circuit defect is reduced.

Another aspect of the present disclosure may provide a multilayer ceramic electronic component having excellent reliability.

According to an aspect of the present disclosure, a multilayer ceramic electronic component includes: a ceramic body having a first surface and a second surface opposing each other in a first direction, a third surface and a fourth surface opposing each other in a second direction, and a fifth surface and a sixth surface opposing each other in a third direction, and including a first internal electrode and a second internal electrode disposed to be alternately stacked in the third direction with a dielectric layer interposed therebetween; a first external electrode connected to the first internal electrode and including a first electrode layer, a first conductive layer, and a first metal layer; a second external electrode connected to the second internal electrode and including a second electrode layer, a second conductive layer, and a second metal layer; and a first coating layer disposed on the ceramic body, the first electrode layer and the second electrode layer, wherein the first conductive layer and the second conductive layer are sintered electrodes including a conductive metal and glass, and the first coating layer includes a plurality of openings disposed on the first electrode layer and the second electrode layer.

According to another aspect of the present disclosure, a multilayer ceramic electronic component includes: a ceramic body including a first internal electrode and a second internal electrode disposed to be alternately stacked with a dielectric layer interposed therebetween; a first external electrode connected to the first internal electrode and including a first electrode layer and a first conductive layer; a second external electrode connected to the second internal electrode and including a second electrode layer and a second conductive layer; a first coating layer, including an inorganic film layer, disposed between the first electrode layer and the first conductive layer and between the second electrode layer and the second conductive layer; and a second coating layer, including at least one vinyl group, disposed to cover the first external electrode and the second external electrode.

According to still another aspect of the present disclosure, a multilayer ceramic electronic component includes: a ceramic body including a first internal electrode and a second internal electrode disposed to be alternately stacked with a dielectric layer interposed therebetween; a first external electrode connected to the first internal electrode and including a first electrode layer and a first conductive layer; a second external electrode connected to the second internal electrode and including a second electrode layer and a second conductive layer; and a first coating layer disposed between the first electrode layer and the first conductive layer and between the second electrode layer and the second conductive layer. The first coating layer has a plating solution penetration prevention layer of an island shape.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
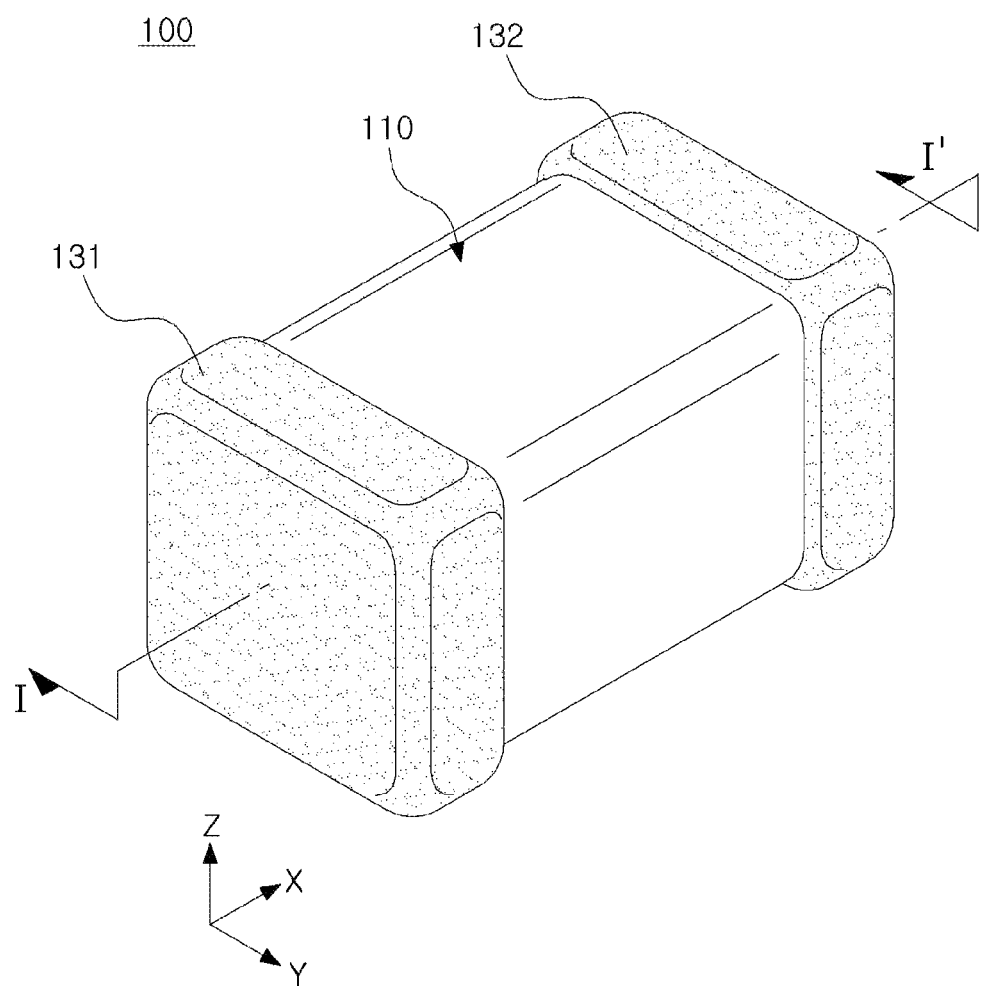
FIG. 1 is a perspective view schematically illustrating a multilayer ceramic electronic component according to an exemplary embodiment in the present disclosure.
Figure 2:
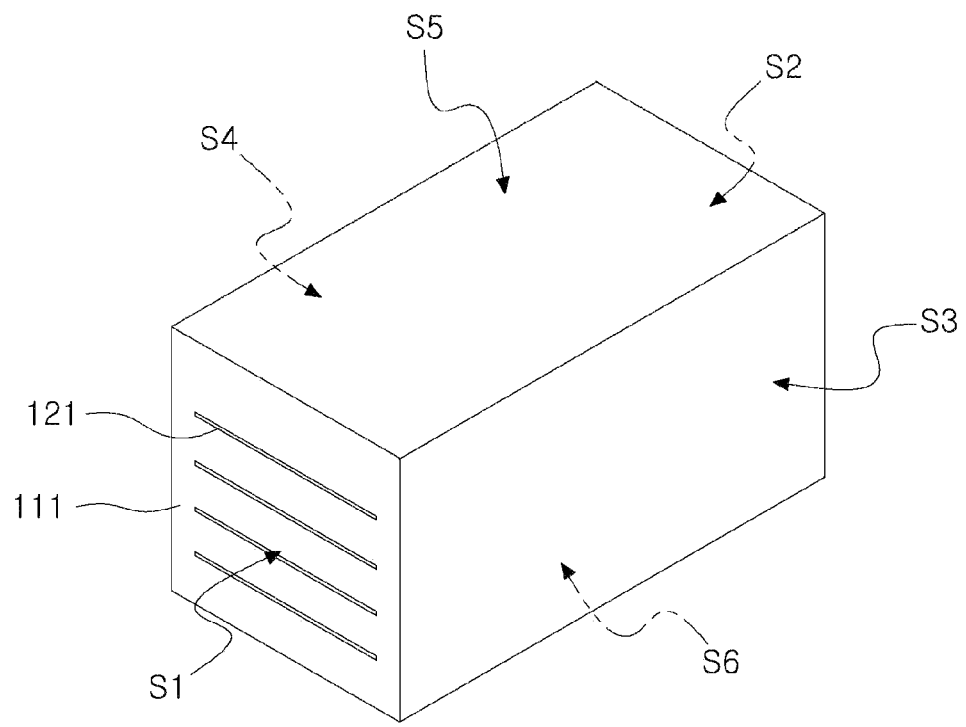
FIG. 2 is a perspective view schematically illustrating a ceramic body of FIG. 1.

Exemplary embodiments of the present disclosure will now be described in detail with reference to the accompanying drawings.

In the drawings, an X direction may be defined as a first direction, an L direction, or a length direction, a Y direction may be defined as a second direction, a W direction, or a width direction, and a Z direction may be defined as a third direction, a T direction, or a thickness direction.

The present disclosure relates to a multilayer ceramic electronic component. FIGS. 1 through 4 are views schematically illustrating a multilayer ceramic electronic component according to an exemplary embodiment of the present disclosure. Referring to FIGS. 1 through 4, a multilayer ceramic electronic component 100 according to an exemplary embodiment may include a ceramic body 110 including a dielectric layer 111 and a first internal electrode 121 and a second internal electrode 122 disposed to be alternately stacked in the third direction (Z direction) with the dielectric layer 111 interposed therebetween and having a first surface S1 and a second surface S2 opposing each other in the first direction (X direction), a third surface S3 and a fourth surface S4 opposing each other in the second direction (Y direction), and a fifth surface S5 and a sixth surface S6 opposing each other in the third direction (Z direction); a first external electrode 131 connected to the first internal electrode 121 and including a first electrode layer 131a, a first conductive layer 131b, and a first metal layer 131c; a second external electrode 132 connected to the second internal electrode 122 and including a second electrode layer 132a, a second conductive layer 132b, and a second metal layer 132c; and a first coating layer 141 disposed on the ceramic body 110, the first electrode layer 131a and the second electrode layer 132a.

Here, the first conductive layer 131b and the second conductive layer 132b may be sintered electrodes including a conductive metal and glass. Also, the first coating layer 141 includes a plurality of openings disposed on the first electrode layer 131a and the second electrode layer 132a. In one example, the first coating layer 141 may be a plating solution penetration prevention layer of an island shape.

Moisture resistance reliability of the multilayer ceramic electronic component may be largely affected by two factors. First, product defects may occur due to penetration of a plating solution during a manufacturing process, and, second, external moisture may penetrate during the use of a finished product, thereby reducing the life of the product. In recent years, the size of products has been reduced and, at the same time, an external electrode having a multi-layer structure has been increasingly used to satisfy various electrical properties and/or mechanical properties. However, when a plating layer is formed on the external electrode having the multi-layer structure, a plating solution may penetrate. In addition, in the case of using a method of forming a protective layer on the outside, there is a limitation in that a bonding force between a surface of a ceramic body and the protective layer is not generally strong and it is difficult to sufficiently secure reliability of the chip when exposed to repeated vibrations. In order to solve the above problems, the present inventors placed a first coating layer 141, which is disposed on the ceramic body and the external electrode of the multilayer ceramic electronic component, on the ceramic body and first and second electrode layers of first and second external electrodes to prevent moisture penetration, suppress ion migration, and improve bonding strength with the multilayer ceramic electronic component, to thereby improving moisture resistance reliability.

The multilayer ceramic electronic component 100 according to an exemplary embodiment in the present disclosure may include the ceramic body 110 including the dielectric layer 111 and the first and second internal electrodes 121 and 122 disposed to be alternately stacked in the third direction (Z direction) with the dielectric layer 111 interposed therebetween.

The ceramic body 110 may include the first and second surfaces S1 and S2 opposing in the first direction (X direction) the third and fourth surfaces S3 and S4 opposing in the second direction (Y direction), and the fifth and sixth surfaces S5 and S6 opposing in the third direction (Z direction).

There is no particular limitation on a specific shape of the ceramic body 110, but as shown, the ceramic body 110 may have a hexahedral shape or a similar shape. Due to the shrinkage of the ceramic powder contained in the ceramic body 110 during a firing process, the ceramic body 110 may have a substantially hexahedral shape, although it is not a hexahedral shape having a complete straight line. If necessary, the ceramic body 110 may be rounded so that the corners are not angled. The rounding treatment may be, for example, barrel polishing, but is not limited thereto.

In the ceramic body 110, the dielectric layer 111, the first internal electrode 121, and the second internal electrode 122 may be alternately stacked. The dielectric layer 111, the first internal electrode 121, and the second internal electrode 122 may be stacked in the third direction (Z direction). The plurality of dielectric layers 111 are in a sintered state, and adjacent dielectric layers 111 may be integrated such that boundaries therebetween may not be readily apparent without using a scanning electron microscope (SEM).

According to an exemplary embodiment in the present disclosure, the dielectric layer 111 may include a component represented by $(Ba_{1-x}Ca_x)(Ti_{1-y}(Zr, Sn, Hf)_y)O_3$ (here, $0 \leq x \leq 1$ and $0 \leq y \leq 0.5$). The component may be, for example, a compound in which Ca, Zr, Sn and/or Hf is partially dissolved in $BaTiO_3$. In the above compositional formula, x may be in the range of 0 or more and 1 or less and y may be in the range of 0 or more and 0.5 or less, but is not limited thereto. For example, when x is 0, y is 0, and z is 0 in the above compositional formula, the component may be $BaTiO_3$. In addition, various ceramic additives, organic solvents, plasticizers, binders, dispersants, and the like may be added to the component according to the purpose of the present disclosure.

The dielectric layer 111 may be formed by adding an additive as necessary to a slurry containing the aforementioned material, applying slurry on a carrier film, and drying the slurry to prepare a plurality of ceramic sheets. The ceramic sheet may be formed by fabricating the slurry into a sheet type having a thickness of several μm by a doctor blade method, but is not limited thereto.

The ceramic body 110 may be formed by alternately stacking a ceramic green sheet in which the first internal electrode 121 is printed on the dielectric layer 111 and a ceramic green sheet in which the second internal electrode 122 is printed on the dielectric layer 111 in the third direction (Z direction). A printing method of the first and second internal electrodes 121 and 122 may be a screen printing method or a gravure printing method, but is not limited thereto.

The first and second internal electrodes 121 and 122 may be stacked so that cross sections thereof are exposed to opposing ends of the ceramic body 110, respectively. Specifically, the first and second internal electrodes 121 and 122 may be exposed to both surfaces of the ceramic body 110 in the first direction (X direction), respectively, and in this case, the first internal electrode 121 may be exposed in a direction of the first surface S1 of the ceramic body 110 and the second internal electrode 122 may be exposed in a direction of the second surface S2 of the ceramic body 110.

The first and second internal electrodes 121 and 122 may include a conductive metal. The conductive metal may include, for example, silver (Ag), nickel (Ni), copper (Cu), tin (Sn), palladium (Pd), platinum (Pt), iron (Fe), gold (Au), silver (Ag), tungsten (W), titanium (Ti), lead (Pb) and may include one or more conductive metals of these alloys. The first and second internal electrodes 121 and 122 may be formed using a conductive paste containing the conductive metal.

In the multilayer ceramic electronic component according to the present disclosure, the first external electrode 131 and the second external electrode 132 may be disposed on an outer surface of the ceramic body 110. The first external electrode 131 may be disposed on the first surface S1 of the ceramic body 110 of the multilayer ceramic electronic component 100 according to the present disclosure, and the second external electrode 132 may be disposed on the second surface S2 of the ceramic body 110.

In an example, the first external electrode 131 of the multilayer ceramic electronic component of the present disclosure may include a first electrode layer 131a, a first conductive layer 131b, and a first metal layer 131c, and the second external electrode 132 may include a second electrode layer 132a, a second conductive layer 132b, and a second metal layer 132c. In this case, a first coating layer 141 to be described later may be disposed between the first electrode layer 131a and the first conductive layer 131b and between the second electrode layer 132a and the second conductive layer 132b. That is, in the first external electrode 131 of the multilayer ceramic electronic component according to the present example, the first electrode layer 131a, the first coating layer 141, the first conductive layer 131b, and the first metal layer 131c may be sequentially stacked. In the second external electrode 132, the second electrode layer 132a, the first coating layer 141, the second conductive layer 132b, and the second metal layer 132c may be sequentially stacked. The first electrode layer 131a may be connected to the first internal electrode 121, and the second electrode layer 132a may be connected to the second internal electrode 122.

In an exemplary embodiment in the present disclosure, the first electrode layer 131a and the second electrode layer 132a of the multilayer ceramic electronic component may be sintered electrodes including a conductive metal. The conductive metal may include at least one of, for example, nickel (Ni), copper (Cu), tin (Sn), palladium (Pd), platinum (Pt), iron (Fe), gold (Au), silver (Ag), tungsten (W).), titanium (Ti), lead (Pb), and alloys thereof.

As an example of a method of forming the first electrode layer 131a and the second electrode layer 132a, the first electrode layer 131a and the second electrode layer 132a may be formed by dipping a ceramic body 110 into a conductive paste including a conductive metal and subsequently firing the resultant structure or by printing the conductive paste on the surface of the ceramic body 110 by a screen printing method or gravure printing method and firing the resultant structure. In addition, the first electrode layer 131a and the second electrode layer 132a may be formed by applying the conductive paste to the surface of the ceramic body 110 or transferring a dried film obtained by drying the conductive paste onto the ceramic body 110 and subsequently firing the resultant structure, but is not limited thereto. For example, the first electrode layer 131a and the second electrode layer 132a may be formed by forming the conductive paste on the ceramic body 110 by various methods other than the methods described above and then firing the same.

In an example of the present disclosure, the first coating layer 141 may be disposed on the first electrode layer 131a and the second electrode layer 132a of the multilayer ceramic electronic component. The first coating layer 141 may be disposed on the ceramic body 110, the first electrode layer 131a, and/or the second electrode layer 132a of the multilayer ceramic electronic component. The first coating layer 141 may be disposed to cover the ceramic body 110 and may be disposed in contact with the first electrode layer 131a and the second electrode layer 132a.

In an exemplary embodiment in the present disclosure, the first coating layer 141 of the multilayer ceramic electronic component may be an inorganic thin film layer. The inorganic thin film layer may be formed of an oxide, a nitride, or a compound thereof of a metal and/or non-metal compound. In this exemplary embodiment, when the first coating layer 141 is an inorganic thin film layer, a chemical reaction with external contaminants may be minimized, thereby improving reliability of the first coating layer 141. Components of the inorganic thin film layer may include an oxide of one or more selected from the group consisting of $Al_2O_3$, $HfO_2$, $ZrO_2$ $La_2O_3$, $SiO_2$, $Ta_2O_5$, $Nb_2O_5$, $Y_2O_3$, $SrTiO_3$, $BaTiO_3$ and a nitride of one or more selected from the group consisting of AlN and $SiN_X$.

Figure 3:
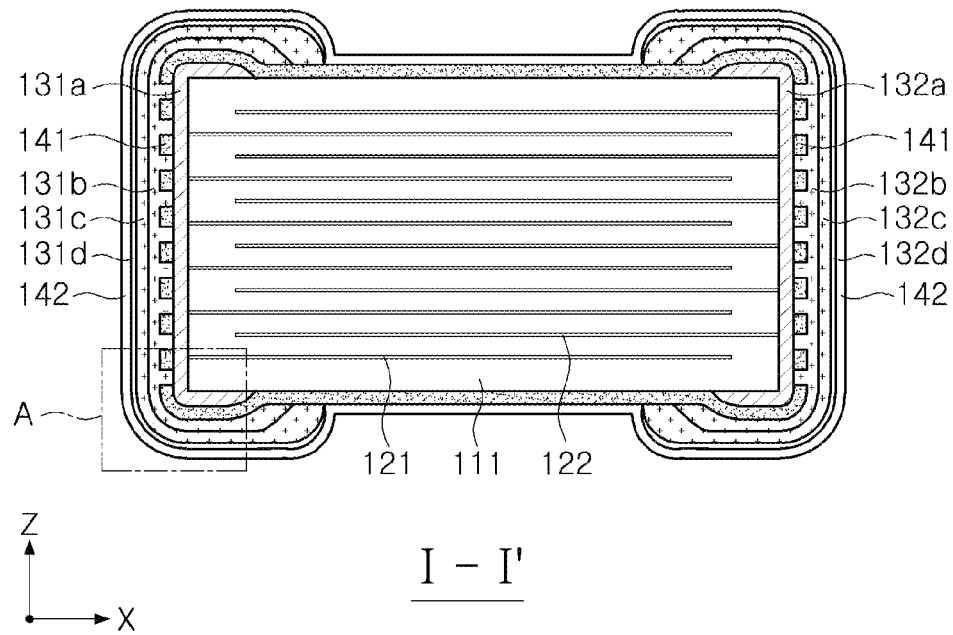
FIG. 3 is a cross-sectional view taken along line I-I' of FIG. 1.
Figure 4:
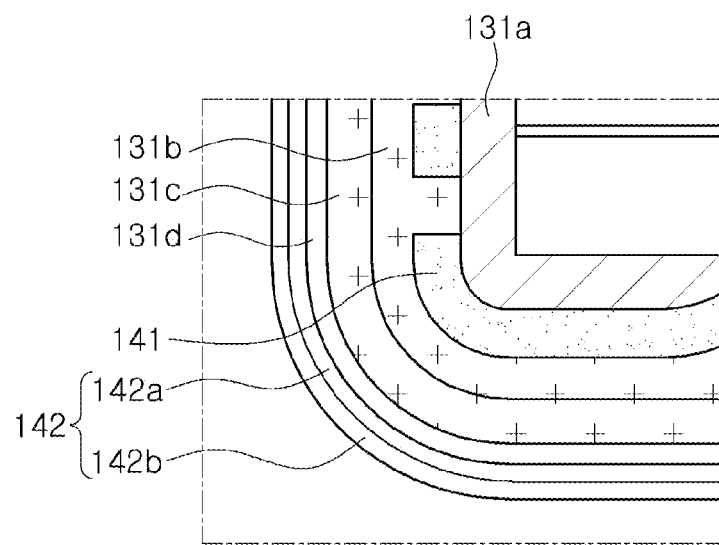
FIG. 4 is an enlarged view of region A of FIG. 3.

In an example, the first coating layer 141 of the multilayer ceramic electronic component according to the present disclosure may include a plurality of openings disposed on the first electrode layer 131a and the second electrode layer 132a. Referring to FIG. 3, the openings may be formed in a region of the first coating layer 141 disposed on the first electrode layer 131a and the second electrode layer 132a. The openings may be disposed to penetrate the first coating layer 141, and two or more openings may be disposed. The opening is a region in which the first coating layer 141 is not disposed, and may function as a connection passage between the first and second electrode layers 131a and 132a and the first and second conductive layers 131b and 132b to be described later. In the multilayer ceramic electronic component according to the present example, since the first coating layer 141 has a plurality of openings, connectivity between the first and second electrode layers 131a and 132a and the first and second conductive layers 131b and 132b may be improved.

In an exemplary embodiment in the present disclosure, the plurality of openings included in the first coating layer 141 of the multilayer ceramic electronic component according to the present disclosure may be formed in the process of forming the first conductive layer 131b and the second conductive layer 132b. For example, the opening disposed in the first coating layer 141 may be formed by dissolving a part of the component of the first coating layer 141. The first coating layer 141 of the multilayer ceramic electronic component according to the present disclosure may include a component formed of oxide or nitride as described above, and the component may be dissolved in glass to be described later, and a region dissolved in the glass may form the opening.

For example, in this exemplary embodiment, the first coating layer 141 is disposed on the first electrode layer 131a and the second electrode layer 132a, and the first conductive layer 131b and the second conductive layer 132b are disposed on the first coating layer 141, and thereafter, the first conductive layer 131b and the second conductive layer 132b may be fired. In this case, when the first conductive layer 131b and the second conductive layer 132b contain glass, a part of the oxide or nitride constituting the first coating layer 141 is dissolved in the glass and removed, and a region in which the first coating layer 141 is dissolved may form the opening. In this case, since the dissolution of the first coating layer 141 by the glass occurs without certain regularity, the plurality of openings included in the first coating layer 141 may not have a regular pattern, may be randomly arranged, and may be arranged irregularly.

In an exemplary embodiment in the present disclosure, an average thickness of the first coating layer 141 of the multilayer ceramic electronic component may satisfy a range of 50 nm or more and/or 200 nm or less. In the present disclosure, "thickness" may refer to a thickness of a member measured in a direction perpendicular to a surface of the member, and "average thickness" may refer to an arithmetic mean of a thickness measured from points of a region in which the member is disposed and equally divided into 10 parts in a cross-section at the center of the multilayer ceramic electronic component taken in a direction perpendicular to the Z axis.

A method of forming the first coating layer 141 of the multilayer ceramic electronic component according to the present disclosure is not particularly limited. For example, the first coating layer 141 may be formed using, for example, an atomic layer deposition (ALD) method, a molecular layer deposition (MLD) method, a chemical vapor deposition (CVD) method, sputtering method, etc, but is not limited thereto.

In an exemplary embodiment in the present disclosure, the first coating layer 141 may be disposed on the first electrode layer 131a and the second electrode layer 132a of the multilayer ceramic electronic component of the present disclosure, and the first conductive layer 131b and the second conductive layer 132b may be disposed on the first coating layer 141. Portions of the first conductive layer 131b and the second conductive layer 132b may be disposed on the first coating layer 141, respectively, and the other remaining portions of the first conductive layer 131b and the second conductive layer 132b may be disposed to be in contact with the first electrode layer 131a and the second electrode layer 132a through the opening of the first coating layer 141.

In an example, the first conductive layer 131b and the second conductive layer 132b may be sintered electrodes including a conductive metal and glass. The conductive metal may include one or more of, for example, nickel (Ni), copper (Cu), tin (Sn), palladium (Pd), platinum (Pt), iron (Fe), gold (Au), silver (Ag), tungsten (W), titanium (Ti), lead (Pb), and alloys thereof. The glass may be a composition in which oxides are mixed. The glass may be at least one selected from the group consisting of silicon oxide, boron oxide, aluminum oxide, transition metal oxide, alkali metal oxide, and alkaline earth metal oxide but is not particularly limited thereto. The transition metal may be one or more selected from the group consisting of zinc (Zn), titanium (Ti), copper (Cu), vanadium (V), manganese (Mn), iron (Fe) and nickel (Ni), the alkali metal may be one or more selected from the group consisting of lithium (Li), sodium (Na) and potassium (K), and the alkaline earth metal may be one or more selected from the group consisting of magnesium (Mg), calcium (Ca), strontium (Sr) and barium (Ba).

At least portions of the first conductive layer 131b and the second conductive layer 132b of the multilayer ceramic electronic component according to the present disclosure may be disposed in contact with the first electrode layer 131a and the second electrode layer 132a, respectively. The portions of the first conductive layer 131b and the second conductive layer 132b disposed in contact with the first and second electrode layers 131a and 132a may be disposed inside the opening of the first coating layer 141. Portions of the first conductive layer 131b and the second conductive layer 132b disposed inside the opening includes a first conductive layer 131b and a second conductive layer 132b disposed in a region in which oxide or nitride of the first coating layer 141 is dissolved, as described above.

When the first conductive layer 131b and the second conductive layer 132b of the multilayer ceramic electronic component according to the present disclosure contain the glass component described above, the glass component has a certain degree of fluidity during sintering and has a predetermined solubility for oxides or nitrides. Accordingly, a region in which a portion of the first coating layer 141 is dissolved forms opening, and the first conductive layer 131b or the second conductive layer 132b may be disposed in the opening, and the first conductive layer 131b and the second conductive layer 132b disposed in the opening may be disposed in contact with the first electrode layer 131a and the second electrode layer 132a, respectively. The first conductive layer 131b and the second conductive layer 132b disposed in the opening of the first coating layer 141 may be disposed without a certain regularity, may not have a certain pattern, may be randomly disposed, and/or may be disposed irregularly.

In an example, the first conductive layer 131b of the multilayer ceramic electronic component 100 of the present disclosure may be disposed to cover the first electrode layer 131a, and the second conductive layer 132b may be disposed to cover the second electrode layer 132a. In the present disclosure, disposing a member to cover a certain region may mean that the member is disposed such that a portion of the region covered by the member is not observed from the outside. In this example, the first conductive layer 131b may be disposed to cover the entirety of the first electrode layer 131a, and the second conductive layer 132b may be disposed to cover the entirety of the second electrode layers 132a.

As an example of a method of forming the first conductive layer 131b and the second conductive layer 132b, the first conductive layer 131b and the second conductive layer 132b may be formed by dipping a ceramic body into a conductive paste including a conductive metal and glass and then firing the ceramic body or may be formed by printing the conductive paste on a surface of the ceramic body through a screen printing method, a gravure printing method, or the like and firing the ceramic body. In addition, the first conductive layer 131b and the second conductive layer 132b may be formed by applying the conductive paste to the surface of the ceramic body or transferring a dry film obtained by drying the conductive paste onto the ceramic body and then firing the ceramic body, but the method of forming the first conductive layer 131b and the second conductive layer 132b is not limited thereto. For example, in addition to the methods described above, the first conductive layer 131b and the second conductive layer 132b may be formed by forming the conductive paste on the ceramic body according to various methods and firing the ceramic body.

According to an example of the present disclosure, the first and second metal layers respectively disposed on the first and second conductive layers 131a and 132a of the multilayer ceramic electronic component may be plating layers. The first and second metal layers may include one or more selected from the group consisting of copper (Cu), tin (Sn), nickel (Ni), palladium (Pd), platinum (Pt), gold (Au), silver (Ag), tungsten (W), titanium (Ti), lead (Pb), and alloys thereof, but is not limited thereto.

In an exemplary embodiment in the present disclosure, the first and second metal layers of the multilayer ceramic electronic component of the present disclosure may have a structure in which two or more plating layers represented by 131c and 131d or 132c and 132d are stacked. The first and second metal layers may have a structure in which two or more plating layers containing different components are stacked, such as a structure in which a tin (Sn) plating layer 131d (or 132d) is stacked on a nickel (Ni) plating layer 131c (or 132d), but is limited thereto. When the first and second metal layers of the multilayer ceramic electronic component of the present disclosure have the structure in which two or more plating layers are stacked as described above, desired mechanical properties may be simultaneously satisfied with excellent moisture resistance reliability. The plating layer may be formed by sputtering or electroplating, but is not limited thereto.

In an example, at least a portion of the first external electrode 131 of the multilayer ceramic electronic component according to the present disclosure may extend onto the third surface S3, the fourth surface S4, the fifth surface S5, and the sixth surface S6 of the ceramic body 110. In addition, at least a portion of the second external electrode 132 may extend onto the third surface S3, the fourth surface S4, the fifth surface S5, and the sixth surface S6 of the ceramic body 110. In this case, the first external electrode 131 and the second external electrode 132 may be disposed to be spaced apart from each other. When at least a portion of the first external electrode 131 and/or the second external electrode 132 extends to the third surface S3, the fourth surface S4, the fifth surface S5, and the sixth surface S6 of the ceramic body 110, the extended portion may function as a so-called band portion and function to improve a mounting strength of the multilayer ceramic electronic component 100 according to the present disclosure and prevent moisture penetration.

In an exemplary embodiment in the present disclosure, the multilayer ceramic electronic component according to the present disclosure may further include a second coating layer 142 disposed on the ceramic body 110, the first external electrode 131, and the second external electrode 132. The second coating layer 142 may be disposed to cover the ceramic body 110, the first external electrode 131, and the second external electrode 132. In this case, the second coating layer 142 may be disposed to cover all of the ceramic body 110, the first external electrode 131, and the second external electrode 132. That is, the second coating layer 142 of the present disclosure may be disposed to cover the entire surface of the multilayer ceramic electronic component 100. Through this, better moisture resistance reliability may be obtained, compared to a case in which the second coating layer 142 is formed only on a portion of the electronic component.

The second coating layer 142 may include a first layer 142a and a second layer 142b. The first layer 142a and the second layer 142b may be sequentially stacked and disposed on the ceramic body 110, the first external electrode 131, and the second external electrode 132. In this case, the first layer 142a may be disposed in direct contact with the ceramic body 110, the first external electrode 131, and the second external electrode 132, and the second layer 142b may be disposed on the first layer 142a.

At this time, the second coating layer 142 may include a crosslinking connecting the first layer 142a and the second layer 142b. In the present disclosure, "bonding" may refer to a state in which surfaces of an adhesive and an adherend are bonded by a bonding force of an interface. The bonding force of the interface may be due to a chemical interaction between surface molecules of the adhesive and the adherend or may be due to mechanical bonding. In the present disclosure, the term "crosslinking" may refer to forming a network structure through chemical/physical bonds such as covalent bonds, ionic bonds, Van der Waals bonds, or hydrogen bonds between molecules. Since the first layer 142a and the second layer 142b are connected through the crosslinking, the first layer 142a and the second layer 142b may have a more excellent bonding force.

In an example of the present disclosure, a component is not particularly limited as long as the first layer 142a of the multilayer ceramic electronic component exhibits excellent adhesion with the ceramic body and/or the second layer 142b to be described later. The first layer 142a may include at least one selected from polystyrene, vinyl acetate, polyester, polyethylene, polypropylene, polyamide, rubber, acrylic, phenol, epoxy, urethane, siloxane, melamine, and alkyd-based polymers, but is not limited thereto.

In an example, the first layer 142a of the multilayer ceramic electronic component according to the present disclosure may include a compound containing two or more vinyl groups. The compound containing two or more vinyl groups is to improve mechanical/chemical strength of the second coating layer 142 according to the present disclosure and may be bonded to the surface of the ceramic body 110 and crosslinked with the second layer 142b to be described later. In the multilayer ceramic electronic component according to the present disclosure, the compound containing two or more vinyl groups may be applied to the first layer 142a to improve bonding strength with the surface of the ceramic body 110 and/or the second layer 142b.

The compound containing two vinyl groups is not particularly limited, but may be, for example, 2,4,6,8-tetramethyl-2,4,6,8-tetravinylcyclotetrasiloxane (V4D4), 1,3,5-trimethyl-1,3,5-trivinyl-cyclotrisiloxane (V3D3), divinylbenzene (DVB), diethyleneglycoldivinylether (DEGDVE), ethyleneglycoldiacrylate(EGDA), ethyleneglycoldimethacrylate (EGDMA), 1,3-diethenyl-1,1,3,3-tetramethyl-disiloxane (V2D2), or the like.

A thickness of the first layer 142a is not particularly limited as long as sufficient bonding strength may be secured, but, for example, an average thickness may satisfy a range of 21 nm or more and/or 420 nm or less.

In an exemplary embodiment in the present disclosure, the second layer 142b of the second coating layer 142 of the multilayer ceramic electronic component may include a hydrophobic polymer. The hydrophobic polymer may refer to a polymer formed from a hydrophobic monomer. In the present disclosure, "hydrophobicity" may mean that a surface formed of a certain component has a contact angle of 90° or more with respect to water at room temperature/1 atmosphere. The hydrophobic monomer is not particularly limited as long as it exhibits sufficient water repellency and may include one or more monomers selected from the group consisting of siloxane-based, acrylic-based, amine-based, carbonate-based, ester-based and fluorocarbon-based monomers.

In an example, the second layer 142b of the multilayer ceramic electronic component according to the present disclosure may include a compound including a vinyl group and fluorine. The vinyl group may form cross-linking with the first layer 142a to enhance the bonding strength of the second layer 142b, and the fluorine-containing compound may provide excellent water repellency and physical/chemical resistance to external contaminants.

The kind of the compound containing the vinyl group and fluorine is not particularly limited. For example, the compound containing the vinyl group and fluorine may include, for example, 1H,1H,2H,2H-perfluorodecylacrylate (PFDA), perfluorodecyl methacrylate (PFDMA), dodecafluoroheptyl acrylate, pentafluorophenyl methacrylate, 3,3,4,4,5,5,6,6,7,7,8,8,9,9,9-pentadecafluorononyl acrylate, 2-methyl-3,3,4,4,5,5,6,6,7,7,8,8,9,9,9-pentadecafluorononyl acrylate, 3,3,4,4,5,5,6,6,7,7,8,8,8-tridecafluorooctyl acrylate, 2-methyl-3,3,4,4,5,5,6,6,7,7,8,8,8-tridecafluorooctyl acrylate, 3,3,4,4,5,5,6,6,7,7,7-undecafluoroheptyl acrylate, 2-methyl-3,3,4,4,5,5,6,6,7,7,7-undecafluoroheptyl acrylate, 3,3,4,4,5,5,6,6,6-nonafluorohexyl acrylate, 2-methyl-3,3,4,4,5,5,6,6,6-nonafluorohexyl acrylate, 3,3,4,4,5,5,6,6,7,7,8,8,9,9,10,10,11,11,11-nonadecafluoroun decyl acrylate, 2-methyl-3,3,4,4,5,5,6,6,7,7,8,8,9,9,10,10,11,11,11-nonadec afluoroundecyl acrylate, 3,3,4,4,5,5,6,6,7,7,8,8,9,9,10,10,11,11,12,12,12-heneicosaf luorododecyl acrylate, 2-methyl-3,3,4,4,5,5,6,6,7,7,8,8,9,9,10,10,11,11,12,12,12-heneicosaf luorododecyl acrylate, 3,3,4,4,5,5,6,6,7,7,8,8,9,9,10,10,11,11,12,12,13,13,13-tric osafluorotridecyl acrylate, 2-methyl-3,3,4,4,5,5,6,6,7,7,8,8,9,9,10,10,11,11,12,12,13,13,13-tric osafluorotridecyl acrylate, 3,3,4,4,5,5,6,6,7,7,8,8,9,9,10,10,11,11,12,12,13,13,14,14,1 4-pentacosafluorotetradecyl acrylate, 2-methyl-3,3,4,4,5,5,6,6,7,7,8,8,9,9,10,10,11,11,12,12,13,13,14,14,1 4-pentacosafluorotetradecyl acrylate, and the like but is not limited thereto.

The thickness of the second layer 142b is not particularly limited as long as sufficient bonding strength may be ensured, but, for example, an average thickness may satisfy a range of 21 nm or more and/or 420 nm or less.

In an exemplary embodiment in the present disclosure, the second coating layer 142 of the multilayer ceramic electronic component may have an average thickness of 50 nm or more and/or 700 nm or less. If the thickness of the second coating layer 142 of the multilayer ceramic electronic component of the present exemplary embodiment is less than the above range, a bonding force of the first layer 142a may be weakened and water repellency may be lowered. In addition, if the thickness of the second coating layer 142 exceeds the above range, ion migration inhibiting power and adhesion of the second coating layer 142 may be excellent but a bonding strength with a solder may be lowered due to the excessively thick second coating layer 142, so that a board adhesion strength may be reduced when the multilayer ceramic electronic component is mounted on a board.

A method of forming the first layer 142a and the second layer 142b of the multilayer ceramic electronic component according to the present disclosure is not particularly limited. For example, the first layer 142a and the second layer 142b may be formed using an atomic layer deposition (ALD) method, a molecular layer deposition (MLD) method, a chemical vapor deposition (CVD) method, sputtering method, etc, but is not limited thereto.

Experimental Example

Suppression of ion migration, bonding strength, mounting defect, and moisture resistance load defect of the multilayer ceramic electronic component according to the present disclosure were tested under the following conditions.

In a component used in the test, first and second electrode layers were formed with copper (Cu) on a ceramic body and then a first coating layer was formed using iCVD equipment. Thereafter, a conductive paste including copper (Cu) was applied to the first coating layer and heat-treated to form first and second conductive layers.

After the first and second conductive layers were formed, an Sn plating layer was formed, and a second coating layer was formed using the iCVD equipment. As the component, 100 MLCCs for mass production of Samsung Electro-Mechanics having a size of 1.6 mm×0.8 mm×0.8 mm were used.

The first coating layer was formed of $Al_2O_3$ as a material and deposited by ALD at a temperature of 250° C. using Al $(CH)_3$ (TMA, trimethylaluminuim) and $NH_3$.

The second coating layer was formed by iCVD, and tetrabutyl peroxide (TBPO) was used as a deposition initiator. As a first layer, 2,4,6,8-Tetramethyl-2,4,6,8-tetravinyl-cyclotetrasiloxane (V4D4) was used, and as a second layer, perfluorodecyl methacrylate (PFDMA) was used.

As for deposition conditions, the multilayer ceramic electronic component was placed on a board maintained at 40° C. and a filament temperature was set to 200° C. Thereafter, the multilayer ceramic electronic component in which thicknesses of the first coating layer and the second coating layer are different was manufactured by adjusting a deposition time.

An ion migration test was conducted by dropping 1.3 ml distilled water between external electrodes at 25° C. and 1 atmosphere and applying 15 V DC power to both external electrodes. Upon applying power, ion migration proceeded and it is observed that dendrites of a metal component grew from a negative (−) electrode to apositive (+) electrode of the MLCC. The moment when both electrodes of the multilayer ceramic electronic component were connected with the grown dendrite, a current of 1 mA or more flowed, and here, the number of components in which the current flowed within 5 minutes was measured.

The bonding strength test was conducted using an adhesive tape having a peel-off of 30 gf/25 mm measured at a speed of 300 mm/min and a 90° angle at 25° C. on a glass board. The adhesive tape was attached to a surface of the multilayer ceramic electronic component, and after 1 minute elapsed, the adhesive tape was separated by applying a force at a 90° angle. After the separation, the number of components from which the second coating layer was removed on the surface to which the adhesive tape was attached was measured.

In the mounting defect test, a multilayer ceramic electronic component is mounted on a board to which an electrode pad is attached using solder, and the number of components which were not aligned was measured In the moisture resistance load test, the number of occurrences of defects when applying a rated voltage at 85° C. and relative humidity of 85% was measured.

TABLE 1

| Thickness of first coating layer (nm) | Plating defect | Thickness of second coating layer (nm) | Capacity defect | Migration defect | Mounting defect | Moisture resistance load defect test |
|---|---|---|---|---|---|---|
| 0 | 0/100 | 200 | 15/100 | 8/100 | 0/100 | 32/100 |
| 10 | 0/100 | | 8/100 | 5/100 | 0/100 | 18/100 |
| 20 | 0/100 | | 4/100 | 3/100 | 0/100 | 13/100 |
| 30 | 0/100 | | 2/100 | 3/100 | 0/100 | 8/100 |
| 40 | 0/100 | | 0/100 | 1/100 | 0/100 | 2/100 |
| 50 | 0/100 | | 0/100 | 0/100 | 0/100 | 0/100 |
| 60 | 0/100 | | 0/100 | 0/100 | 0/100 | 0/100 |
| 70 | 0/100 | | 0/100 | 0/100 | 0/100 | 0/100 |
| 80 | 0/100 | | 0/100 | 0/100 | 0/100 | 0/100 |
| 90 | 0/100 | | 0/100 | 0/100 | 0/100 | 0/100 |
| 100 | 0/100 | | 0/100 | 0/100 | 0/100 | 0/100 |
| 120 | 0/100 | | 0/100 | 0/100 | 0/100 | 0/100 |
| 140 | 0/100 | | 0/100 | 0/100 | 0/100 | 0/100 |
| 160 | 0/100 | | 0/100 | 0/100 | 0/100 | 0/100 |
| 180 | 0/100 | | 0/100 | 0/100 | 0/100 | 0/100 |
| 200 | 0/100 | | 0/100 | 0/100 | 0/100 | 0/100 |
| 250 | 26/100 | | 12/100 | 0/100 | 0/100 | 2/100 |
| 300 | 86/100 | | 39/100 | 0/100 | 0/100 | 4/100 |
| 400 | 100/100 | | 73/100 | 0/100 | 0/100 | 5/100 |

Referring to Table 1, it can be seen that, when the thickness of the second coating layer is 200 nm, if the thickness of the first coating layer is less than 50 nm, ion migration occurred and moisture resistance load defect appear, but it can be seen that, when the thickness of the first coating layer is 50 nm, excellent results are obtained in all tests. In addition, it can be seen that, when the thickness of the first coating layer exceeds 200 nm under the same conditions, a number of plating defect and capacity defect occur, but when the thickness of the first coating layer is 200 nm, no defect occurs in all kinds of tests.

conditions, mounting defect occurs, but when the thickness of the second coating layer is 700 nm, no defect occurs in all kinds of tests.

Therefore, when the test results are put together, it can be seen that excellent results are obtained in all kinds of tests when an average thickness of the first coating layer of the multilayer ceramic electronic component is 50 nm or more and/or 200 nm or less, and it can be seen that excellent results are obtained in all kinds of tests when an average thickness of the second coating layer is 50 nm or more and/or 700 nm or less.

TABLE 2

| Thickness of first coating layer (nm) | Thickness of second coating layer (nm) | Plating defect | Capacity defect | Migration defect | Mounting defect | Moisture resistance load defect test |
|---|---|---|---|---|---|---|
| 100 | 10 | 0/100 | 0/100 | 7/100 | 0/100 | 17/100 |
| | 20 | 0/100 | 0/100 | 5/100 | 0/100 | 9/100 |
| | 30 | 0/100 | 0/100 | 3/100 | 0/100 | 6/100 |
| | 40 | 0/100 | 0/100 | 2/100 | 0/100 | 3/100 |
| | 50 | 0/100 | 0/100 | 0/100 | 0/100 | 0/100 |
| | 60 | 0/100 | 0/100 | 0/100 | 0/100 | 0/100 |
| | 70 | 0/100 | 0/100 | 0/100 | 0/100 | 0/100 |
| | 80 | 0/100 | 0/100 | 0/100 | 0/100 | 0/100 |
| | 90 | 0/100 | 0/100 | 0/100 | 0/100 | 0/100 |
| | 100 | 0/100 | 0/100 | 0/100 | 0/100 | 0/100 |
| | 150 | 0/100 | 0/100 | 0/100 | 0/100 | 0/100 |
| | 200 | 0/100 | 0/100 | 0/100 | 0/100 | 0/100 |
| | 300 | 0/100 | 0/100 | 0/100 | 0/100 | 0/100 |
| | 400 | 0/100 | 0/100 | 0/100 | 0/100 | 0/100 |
| | 500 | 0/100 | 0/100 | 0/100 | 0/100 | 0/100 |
| | 600 | 0/100 | 0/100 | 0/100 | 0/100 | 0/100 |
| | 700 | 0/100 | 0/100 | 0/100 | 0/100 | 0/100 |
| | 800 | 0/100 | 0/100 | 0/100 | 8/100 | 0/100 |

Referring to Table 2, it can be seen that, when the thickness of the first coating layer is 100 nm, if the thickness of the second coating layer is less than 50 nm, ion migration occurred and moisture resistance load defect appear, but it can be seen that, when the thickness of the second coating layer is 50 nm, excellent results are obtained in all tests. In addition, it can be seen that, when the thickness of the second coating layer exceeds 700 nm under the same As set forth above, according to exemplary embodiments of the present disclosure, deterioration of characteristics due to moisture penetration into the multilayer ceramic electronic component may be prevented.

According to exemplary embodiments of the present disclosure, ion migration of the multilayer ceramic electronic component may be suppressed.

According to exemplary embodiments of the present disclosure, a short-circuit defect of the multilayer ceramic electronic component may be reduced.

According to exemplary embodiments of the present disclosure, the multilayer ceramic electronic component having excellent reliability may be provided.

While exemplary embodiments have been shown and described above, it will be apparent to those skilled in the art that modifications and variations could be made without departing from the scope of the present disclosure as defined by the appended claims.

What is claimed is:

1. A multilayer ceramic electronic component comprising:
a ceramic body having a first surface and a second surface opposing each other in a first direction, a third surface and a fourth surface opposing each other in a second direction, and a fifth surface and a sixth surface opposing each other in a third direction, the ceramic body including a first internal electrode and a second internal electrode disposed to be alternately stacked in the third direction with a dielectric layer interposed therebetween;
a first external electrode connected to the first internal electrode which extends from the first surface, and including a first electrode layer, a first conductive layer, and a first metal layer;
a second external electrode connected to the second internal electrode which extends from the second surface, and including a second electrode layer, a second conductive layer, and a second metal layer;
a first coating layer disposed on the ceramic body, the first electrode layer and the second electrode layer; and
a second coating layer disposed on the ceramic body, the first external electrode, and the second external electrode,
wherein the first conductive layer and the second conductive layer are sintered electrodes including a conductive metal and glass, and the first coating layer includes a plurality of openings disposed on the first electrode layer and the second electrode layer,
the second coating layer includes a first insulating layer and a second layer covering the first insulating layer, and
the first insulating layer and the second layer are disposed on one of the first surface and the second surface to cover an end of the first internal electrode or an end of the second internal electrode.

2. The multilayer ceramic electronic component of claim 1, wherein:
the first electrode layer, the first coating layer, the first conductive layer, and the first metal layer are sequentially stacked in the first external electrode,
the second electrode layer, the first coating layer, the second conductive layer, and the second metal layer are sequentially stacked in the second external electrode, and
the first electrode layer and the first conductive layer are connected to each other and the second electrode layer and the second conductive layer are connected to each other through the plurality of openings of the first coating layer.

3. The multilayer ceramic electronic component of claim 1, wherein:
the first electrode layer includes a portion disposed on the first surface of the ceramic body and another portion extending onto the third, fourth, fifth, and sixth surfaces of the ceramic body, and the second electrode layer includes a portion disposed on the second surface of the ceramic body and another portion extending onto the third, fourth, fifth, and sixth surfaces of the ceramic body.

4. The multilayer ceramic electronic component of claim 1, wherein the first electrode layer and the second electrode layer are sintered electrodes including a conductive metal.

5. The multilayer ceramic electronic component of claim 1, wherein the first coating layer includes one or more selected from a group consisting of $Al_2O_3$, $HfO_2$, $ZrO_2$, $La_2O_3$, $SiO_2$, $Ta_2O_5$, $Nb_2O_5$, $Y_2O_3$, $SrTiO_3$, $BaTiO_3$, AlN, and $SiN_x$.

6. The multilayer ceramic electronic component of claim 1, wherein an average thickness of the first coating layer is 20 nm or more and/or 200 nm or less.

7. The multilayer ceramic electronic component of claim 1, wherein the first metal layer and the second metal layer are plating layers.

8. The multilayer ceramic electronic component of claim 7, wherein the first metal layer and the second metal layer have a structure in which two or more plating layers are stacked.

9. The multilayer ceramic electronic component of claim 1, wherein the first insulating layer includes a polymer including two or more vinyl groups.

10. The multilayer ceramic electronic component of claim 1, wherein the second layer includes a hydrophobic polymer.

11. The multilayer ceramic electronic component of claim 1, wherein the second layer includes a compound including a vinyl group and fluorine.

12. The multilayer ceramic electronic component of claim 1, wherein the first insulating layer and the second layer are sequentially stacked and disposed on the ceramic body, the first external electrode, and the second external electrode.

13. The multilayer ceramic electronic component of claim 12, wherein the first insulating layer is disposed in direct contact with the first external electrode, and the second external electrode.

14. A multilayer ceramic electronic component comprising:
a ceramic body including a first internal electrode and a second internal electrode disposed to be alternately stacked with a dielectric layer interposed therebetween;
a first external electrode connected to the first internal electrode which extends from a first surface of the ceramic body, and including a first electrode layer and a first conductive layer;
a second external electrode connected to the second internal electrode which extends from a second surface of the ceramic body opposing the first surface in a first direction, and including a second electrode layer and a second conductive layer;
a first coating layer, including an inorganic film layer, disposed between the first electrode layer and the first conductive layer and between the second electrode layer and the second conductive layer; and
a second coating layer, including at least one vinyl group, disposed to cover the first external electrode and the second external electrode,
wherein the second coating layer includes a first layer and a second layer, and
on one of the first surface and the second surface, the second layer is disposed on the first surface in the first direction.

15. The multilayer ceramic electronic component of claim 14, wherein:

the first coating layer includes a plurality of openings penetrating the first coating layer, and through the plurality of openings, the first electrode layer and the first conductive layer are in contact with each other and the second electrode layer and the second conductive layer are in contact with each other.

16. The multilayer ceramic electronic component of claim 15, wherein:

the ceramic body has a third surface and a fourth surface opposing each other in a second direction, and a fifth surface and a sixth surface opposing each other in a third direction, and the plurality of openings of the first coating layer are disposed on the first and second surfaces of the ceramic body, and the fifth and sixth surfaces of the ceramic body are free of the plurality of openings of the first coating layer.

17. The multilayer ceramic electronic component of claim 14, wherein a portion of the first coating layer covering the first electrode layer and a portion of the first coating layer covering the second electrode layer are connected to each other.

18. The multilayer ceramic electronic component of claim 17, wherein a portion of the second coating layer covering the first external electrode and a portion of the second coating layer covering the second external electrode are connected to each other.

19. A multilayer ceramic electronic component comprising:

a ceramic body including a first internal electrode and a second internal electrode disposed to be alternately stacked with a dielectric layer interposed therebetween;

a first external electrode connected to the first internal electrode which extends from a first surface of the ceramic body, and including a first electrode layer and a first conductive layer;

a second external electrode connected to the second internal electrode which extends from a second surface of the ceramic body opposing the first surface in a first direction, and including a second electrode layer and a second conductive layer;

a first coating layer disposed between the first electrode layer and the first conductive layer and between the second electrode layer and the second conductive layer; and a second coating layer disposed on the first external electrode and the second external electrode, wherein the first coating layer has a plating solution penetration prevention layer of an island shape, the second coating layer includes a first insulating layer and a second layer covering the first insulating layer, and the first insulating layer includes a material different from the second layer.

20. The multilayer ceramic electronic component of claim 19, wherein:

the first coating layer includes a plurality of openings penetrating the first coating layer, and through the plurality of openings, the first electrode layer and the first conductive layer are in contact with each other and the second electrode layer and the second conductive layer are in contact with each other.

21. The multilayer ceramic electronic component of claim 19, wherein a portion of the first coating layer covering the first electrode layer and a portion of the first coating layer covering the second electrode layer are connected to each other.

22. The multilayer ceramic electronic component of claim 19, wherein a portion of the second coating layer covering the first external electrode and a portion of the second coating layer covering the second external electrode are connected to each other.

* * * * *